May 14, 1929.   G. S. ELDRED   1,712,790
LIQUID DISPENSER
Filed March 11, 1926
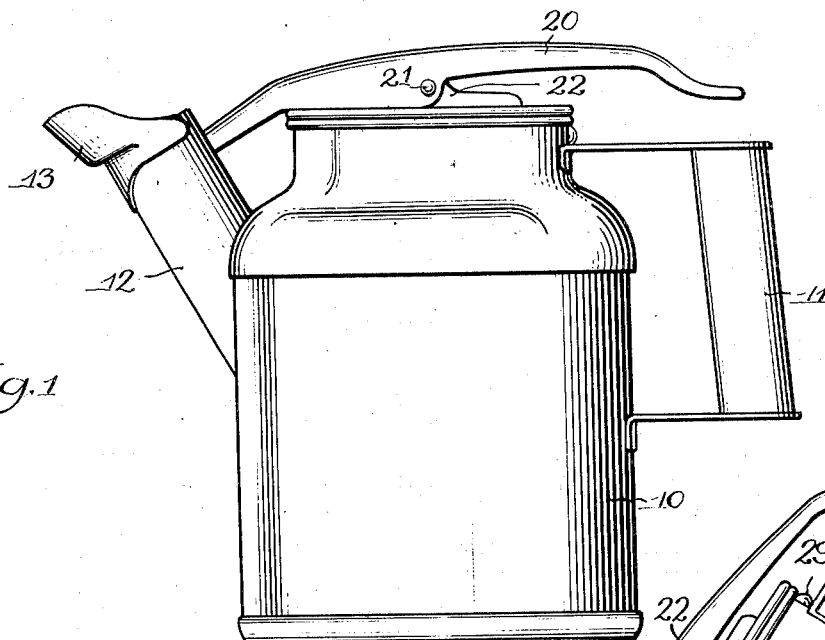
Fig.1
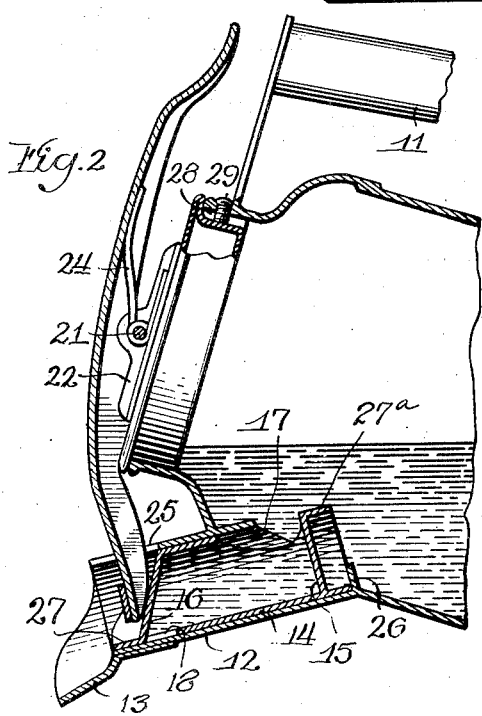
Fig.2
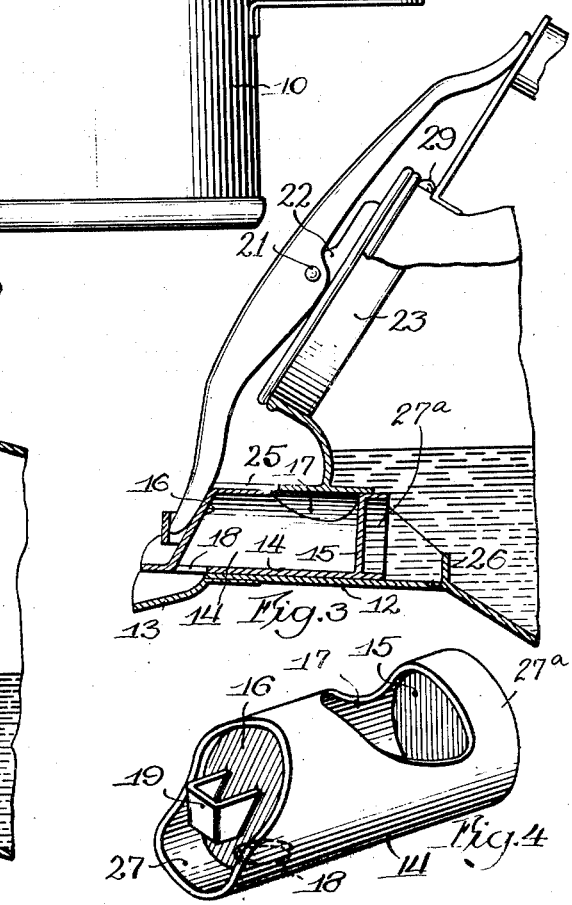
Fig.3
Fig.4
Witness:
Chas. R. Koursh
Inventor,
George S. Eldred,
George Bayard Jones Atty.

Patented May 14, 1929.

1,712,790

UNITED STATES PATENT OFFICE.

GEORGE S. ELDRED, OF CHICAGO, ILLINOIS, ASSIGNOR, BY MESNE ASSIGNMENTS, TO THE BASTIAN-BLESSING COMPANY, A CORPORATION OF ILLINOIS.

LIQUID DISPENSER.

Application filed March 11, 1926. Serial No. 93,882.

My invention relates to improvements in liquid dispensers.

The principal object of the invention is to provide an improved dispensing receptacle for use in restaurants and hotels, for instance, where a convenient and sanitary means is desirable for dispensing measured quantities of cream into beverage cups, or the like.

Another object is to provide a dispenser which will not cause a blackening of even small quantities of cream between relatively removable parts.

Other more specific objects relate to various features of construction and arrangement of parts which will become apparent from a consideration of the accompanying drawings, wherein Figure 1 is a side elevation illustrating a form of my invention.

Fig. 2 is a vertical central section of the receptacle shown in Fig. 1, illustrating the same in position for dispensing fluid therefrom.

Fig. 3 is a similar view showing the mechanism in dispensing position.

Fig. 4 is a perspecive detail of the sliding bucket.

In the drawings, 10 is the receptacle, which is preferably provided with a handle 11 so positioned with reference to the center of gravity of the device as a whole that when the receptacle is lifted it tends to gravitate to such position that the central axis of the receptacle which is normally vertical becomes almost horizontal, somewhat as shown in Fig. 2, although it may be tipped even more, so that all of the cream may be discharged therefrom without increasing the angle of inclination.

The spout 12 is preferably cylindrical, and is positioned at a suitable angle, the outer end of the spout having a discharge lip 13 depressed or offset somewhat, as shown, to provide sufficient clearance for the discharge of fluid from the bucket 14, which is movable longitudinally in the spout 12. The bucket member 14 is closed at its lower end by means of a transverse partition 15, and at its upper end by an inclined partition 16. Intermediate the partitions are two openings, one the intake opening 17 near the lower partition 15 on the upper side of said bucket, and the other a discharge opening 18 near the upper partition 16 on the lower side of said bucket, as shown.

A rectangular socket member 19 is secured to the upper end of the bucket 14, as by soldering the same to the outer face of the partition 16, as clearly shown, particularly in Fig. 4. The socket 19 receives the forward end of the lever 20, which is pivoted at 21 to ears 22 secured to the upper surface of the receptacle lid or closing member 23. A spring 24 exerts pressure on the under surface of the lever 20 in a direction to cause the same to move the bucket 14 to the closing position illustrated in Fig. 2. The opposite or rear end of the lever 20 extends in the direction of the handle 11 to a convenient position for operating the same by the thumb of the user. After the cream has been placed in the receptacle, the cover 23 is pressed to closing position, the forward end of the lever having been first inserted in the socket 19. In lifting the receptacle by means of handle 11, the center of gravity thereof is such that it tends to move to the discharging or dispensing position, shown in Figs. 2 and 3. When in this position, it will be seen, from Fig. 2, that liquid from the receptacle can freely flow into the bucket 15 through the opening 17. The discharge opening 18 is closed by a portion of the cylindrical wall of the spout 12, as shown in Fig. 2. Depressing the lever 20 causes the bucket 14 to move longitudinally in the spout 12 to the position shown in Fig. 3. In this position the opening 18 overlies the depressed lip 13, while the opening 17 is closed by the cylindrical wall of the spout, thereby cutting off communication with the body of fluid in the receptacle. The measured quantity of cream in the bucket 14 is thereby discharged through the opening 18, as will be clear.

A slot 25 is provided in the spout 12 on the side adjacent the upper end of the bucket, in which the lever 20 slides. This slot 25 slightly overlaps the opening 17 in the bucket 14 when in discharging position, as shown in Fig. 3, whereby air is admitted to the bucket to permit the free flow of the liquid through the discharge opening 18. In the operation of the device, the ports are so proportioned that port 18 begins to be uncovered before the forward end of port 17 is uncovered. With this arrangement the cream begins to discharge through port 18 before port 17 is in communication with the outer air, and thus there is no leakage of the cream through the port 17 and through the slot 25. When the fluid has been discharged the lever is released and the spring 24 carries the bucket back to the position shown in Fig. 2. A suitable lug 26 constitutes a stop member for limiting the inward movement of the bucket. A lip 27 extends upwardly from opening 18 to prevent leakage through said opening, while a rear flange 27a prevents the escape of liquid through the opening 17 from the receptacle when the bucket is in discharging position as shown in Fig. 3. The bucket 14, although it is freely slidable in the spout 12, does not so closely fit the inner surface thereof as to cause the cream to be blackened as is the case with many of the present dispensing devices. Furthermore, the sliding bucket is located at the top of the device, and, hence, there is no slow leakage through it when the receptacle is at rest. Where a receptacle has a measuring faucet at the bottom, the faucet has to be a ground fit so that it cannot leak. As a result the cream causes the parts to stick and the cream itself turns black, being ground between the close fitting parts. These black specks in the cream are objectionable.

It will be seen that the parts of the dispenser can be separated readily, as by pulling out the cover 23 and attached lever 20, after which the bucket 14 is freely slidable out of the spout 12. The parts can therefore be readily inspected, cleaned and sterilized and quickly replaced in operative position. The square configuration of the loop 19 prevents the bucket from twisting when it is moved outwardly, and thus insures proper registration of the ports. The forward end of the lever 20 rests on the wall 16, and thus may be fulcrumed thereon in withdrawing the cover 23, which is a tight fit. Said cover is thus withdrawn outwardly without binding. In withdrawing the cover the operator merely pulls upwardly on the rear end of said lever, the bucket resting on the lip 26 and resisting the inward thrust. When the container is tipped to the position shown in Figs. 2 and 3, it is necessary that the lower half of said cover at least have an air tight fit, and that some communication with the outer air be established to facilitate the discharge of cream. An air port is provided through a recess 28, Fig. 2. Into this recess a screw 29 projects which can be used as an adjusting means to press the cover to the opposite wall of the circular opening, thereby insuring an air tight joint should such adjustment become necessary after long continued use.

The offset lip 13 is important in that it acts as a guard to prevent injury to the spout and bucket, such as might be caused by striking it against other objects and interfering with the accuracy of its fit in the spout. Said lip also directs the cream outwardly and collects any drip from the opening 18, in addition to such drip as may take place from the lip 27, thus insuring a single small drip instead of several.

Although I have shown a certain embodiment of my invention for the purposes of illustration, it will be apparent that various changes may be made therein without departing from the spirit of the invention, and I do not wish to be restricted to the specific embodiment herein shown and described, except as limited thereto by the appended claims.

What I claim is:

1. A liquid dispenser comprising a receptacle, a discharge member communicating therewith having its outlet end normally above its inlet end, and a measuring bucket slidable in said member from intake to discharge position and vice versa, said bucket having an intake opening, said opening being closed to the fluid in said receptacle and open to the atmosphere when said bucket is in discharging position.

2. A device of the class described comprising a receptacle having a discharge spout with its outlet end normally above its inlet end, a measuring bucket slidably positioned therein, said bucket having a discharge opening and an intake opening normally providing communication with the interior of said receptacle, and means for sliding said bucket in said spout to uncover said discharge opening, said intake opening being thereby closed to communication with the interior of said receptacle and open to the atmosphere.

3. A device of the class described comprising a receptacle having an integral discharge spout having a slot in its upper end, a cover for said receptacle, a lever pivotally attached to said cover and having one end thereof extending through said slot into said spout, and a sliding bucket in said spout removably engaged by said lever and actuatable by the same for discharging measured quantities of fluid from said receptacle through said spout, said bucket being freely slidable from said spout upon removal of said cover and lever from said receptacle.

4. A device of the class described comprising a receptacle having a handle on one side thereof, and a slotted discharge spout on the opposite side, a cover for said receptacle, said parts being so related that when lifted by said handle the receptacle tends to assume a position in which the said spout is in position to permit the discharge of fluid from said receptacle, a lever pivoted to said cover and extending into the slot of said spout, and a bucket reciprocable in said spout by said lever for discharging intermittently measured quantities of fluid, said lever being guided by said bucket, said slot serving to admit air to the bucket when in discharging position to facilitate the flow of liquid from the bucket.

5. Apparatus of the class described comprising a receptacle having a liquid discharge spout, a bucket in said spout for dispensing measured quantities of liquid from said receptacle, said bucket having an inlet and an outlet, said outlet being closed when said inlet is open to communication with the interior of said receptacle, and means comprising a lever for moving said bucket in said spout to open said outlet and close said inlet to communication with the interior of said receptacle, said spout having a slot comprising an air port arranged to admit air to said bucket through said inlet after said outlet has arrived at initial discharging position, thereby permitting the free flow of liquid from said bucket and preventing leaking through said inlet and air port, said lever being guided in said slot.

6. A liquid receptacle having a discharge spout on a side constituting the lower side thereof when said receptacle is moved to position to discharge fluid through said spout, said receptacle having an opening in the top thereof, a frictionally seated cover for closing said opening, and means at the side of said opening most remote from said spout for pressing said cover against the opposite wall of said opening to prevent leakage therethrough when said receptacle is in discharging position.

7. A liquid receptacle having a discharge spout on a side constituting the lower side thereof when said receptacle is moved to position to discharge fluid through said spout, said receptacle having an opening in the top thereof, a frictionally seated cover for closing said opening, and means at the side of said opening most remote from said spout for pressing said cover against the opposite wall of said opening to prevent leakage therethrough when said receptacle is in discharging position, said means comprising an adjustable screw carried by the upper portion of said receptacle and extending into frictional contact with the cover when the latter is pressed to closed position.

8. A liquid receptacle having a handle on one side thereof and a discharge spout on the opposite side, a discharge bucket slidable in said spout, said bucket being adapted to gravitate to discharging position when lifted by said handle, a frictionally seated cover for said receptacle, a lever pivoted to said cover and extending into said spout, said lever pivoting on the end thereof in said spout when said lever is moved in a direction to lift said cover from said receptacle, and means for increasing the frictional contact of said cover with said receptacle to prevent leakage past said cover when the receptacle is in discharging position.

9. A liquid receptacle having a handle on one side thereof and a discharge spout on the opposite side, a discharge bucket slidable in said spout, said bucket being adapted to gravitate to discharging position when lifted by said handle, a frictionally seated cover for said receptacle, a lever pivoted to said cover and extending into said spout, said lever pivoting on the end thereof in said spout when said lever is moved in a direction to lift said cover from said receptacle, and means for increasing the frictional contact of said cover with said receptacle to prevent leakage past said cover when the receptacle is in discharging position, said means comprising an adjustable screw, carried by the upper portion of said receptacle and extending into frictional contact with the cover when the latter is pressed to closed position.

10. A device of the class described comprising a receptacle having a discharge spout, a dispensing bucket in said spout, a cover for said receptacle, and a lever for actuating said bucket, said lever being pivoted intermediate its ends to said cover, one end of said lever extending into said spout into engagement with said bucket and against which said end of said lever pivots when the opposite end thereof is moved in a direction to remove said cover from said receptacle.

11. A device of the class described comprising a receptacle having a cylindrical spout, a cylindrical discharge bucket slidable in said spout, said bucket having diagonally disposed openings constituting intake and outlet ports, means for moving said bucket for alternately uncovering said ports, and an extension adjacent each of said ports integral with said bucket, the extension adjacent the intake opening serving in cooperation with the walls of said spout to prevent leakage into said bucket and the other extension similarly serving to prevent leakage from said bucket through said outlet port when said ports are closed, respectively.

12. A device of the class described comprising a receptacle having a spout with a laterally offset lip, a measuring bucket slidable in said spout and having a lateral discharge port and a lip extending beyond the same, a cover for said receptacle removable therefrom, a lever pivotally mounted on said cover, and means on said bucket co-operating with the end of said lever to prevent rotation of said bucket about its longitudinal axis and thus insure discharge of the liquid from said port over said lip, said means comprising a socket member freely engageable with and disengageable from said lever upon removal of said cover from closed position.

13. A device of the class described comprising a receptacle having an angularly disposed spout, said spout having an offset lip at its outer end, and a reciprocable bucket in said spout provided with a side delivery opening for discharging measured quantities of liquid from said receptacle through said spout to said discharge lip, a lever for reciprocating said bucket, said bucket having a member extending longitudinally beyond said opening forming a second lip, said first lip serving as a guard to protect said second lip.

In testimony whereof, I have subscribed my name.

GEORGE S. ELDRED.